United States Patent
Barsness et al.

(10) Patent No.: US 7,171,424 B2
(45) Date of Patent: Jan. 30, 2007

(54) SYSTEM AND METHOD FOR MANAGING PRESENTATION OF DATA

(75) Inventors: Eric L. Barsness, Pine Island, MN (US); Randy W. Ruhlow, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 506 days.

(21) Appl. No.: 10/793,417

(22) Filed: Mar. 4, 2004

(65) Prior Publication Data

US 2005/0198011 A1    Sep. 8, 2005

(51) Int. Cl.
*G06F 17/00* (2006.01)

(52) U.S. Cl. ...................................... 707/102; 707/101

(58) Field of Classification Search .................... 707/1, 707/3, 9, 101, 102, 104.1, 100; 715/523, 715/526
See application file for complete search history.

(56) References Cited

OTHER PUBLICATIONS

Marchionini et al., Extending User Understanding of Federal Statistics in Tables, pp. 1-7.*

* cited by examiner

*Primary Examiner*—Apu M Mofiz
(74) *Attorney, Agent, or Firm*—Patterson & Sheridan

(57) ABSTRACT

A system, method and article of manufacture for presentation of data on a display device and, more particularly, for managing presentation of data in a tabular form on a display device. One embodiment provides a method of managing display of requested data on a display device. The method comprises, in response to a request for data, receiving the requested data in a tabular form having a plurality of columns and rows ordered according to an initial order; re-ordering at least one of the columns and rows, wherein the re-ordering is done on the basis of rules configured to intelligently arrange presentation of the requested data to a user; and outputting the re-ordered requested data for display on the display device.

42 Claims, 11 Drawing Sheets

SYSTEM AND METHOD FOR MANAGING PRESENTATION OF DATA

BACKGROUND OF THE INVENTION

1. Field of the Invention

The present invention generally relates to presentation of data on a display device and, more particularly, to managing presentation of query results on a display device.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, a DBMS can be structured to support a variety of different types of operations for a requesting entity (e.g., an application, the operating system or an end user). Such operations can be configured to retrieve, add, modify and delete information being stored and managed by the DBMS. Standard database access methods support these operations using high-level query languages, such as the Structured Query Language (SQL). The term "query" denominates a set of commands that cause execution of operations for processing data from a stored database. For instance, SQL supports four types of query operations, i.e., SELECT, INSERT, UPDATE and DELETE. A SELECT operation retrieves data from a database, an INSERT operation adds new data to a database, an UPDATE operation modifies data in a database and a DELETE operation removes data from a database.

Processing queries and query results can consume significant system resources, particularly processor resources. Furthermore, one difficulty when dealing with large query results, i.e., query results including a large amount of data, is to accurately render the data of the query results on a display device for presentation to a user. For instance, assume a query result in tabular form having 175 columns and 1500 rows. Accordingly, the query result consists of more than 250,000 data fields which must be displayed to the user on a display device. However, this number of data fields significantly exceeds the number of displayable data fields on the display device.

A number of techniques have been employed to deal with this difficulty. For instance, the complete query result can be displayed in a graphical window having horizontal and vertical scrollbars which allow the user to navigate through the query result. However, navigating through the complete query result to locate selected information therein can be a tedious process for the user. Alternatively, the query result can be split into distinct result units which are separately displayed on the display device. To this end, suitable criteria are required for accurately splitting the complete query result into the distinct result units. Furthermore, suitable presentation rules defining, for instance, a sequence of display of the distinct result units on the display device are required in order to intelligently support the user in navigating through the distinct result units. However, such techniques still require a significant amount of user interaction and are, therefore generally an ineffective means for presenting large query results. In other words, relevant data still needs to be identified manually by the user.

Therefore, there is a need for an effective technique for managing presentation of query results on a display device.

SUMMARY OF THE INVENTION

The present invention is generally directed to managing presentation of data on a display device and, more particularly, to managing presentation of query results obtained in response to queries executed against one or more databases in a data processing system on a display device.

One embodiment provides a method of managing display of requested data on a display device. The method comprises, in response to a request for data, receiving the requested data in a tabular form having a plurality of columns and rows ordered according to an initial order; re-ordering at least one of the columns and rows, wherein the re-ordering is done on the basis of rules configured to intelligently arrange presentation of the requested data to a user; and outputting the re-ordered requested data for display on the display device.

Another embodiment provides a computer readable medium containing a program which, when executed, performs a process of managing display of requested data on a display device. The process comprises, in response to a request for data, receiving the requested data in a tabular form having a plurality of columns and rows ordered according to an initial order; re-ordering at least one of the columns and rows, wherein the re-ordering is done on the basis of rules configured to intelligently arrange presentation of the requested data to a user; and outputting the re-ordered requested data for display on the display device.

Still another embodiment provides a data processing system comprising a data source, a display device, and a re-ordering application program residing in memory for managing display of requested data on the display device. The re-ordering application program is configured for, in response to a request for data, receiving the requested data in a tabular form having a plurality of columns and rows ordered according to an initial order; re-ordering at least one of the columns and rows, wherein the re-ordering is done on the basis of rules configured to intelligently arrange presentation of the requested data to a user; and outputting the re-ordered requested data for display on the display device.

BRIEF DESCRIPTION OF THE DRAWINGS

So that the manner in which the above recited features of the present invention are attained can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1A:
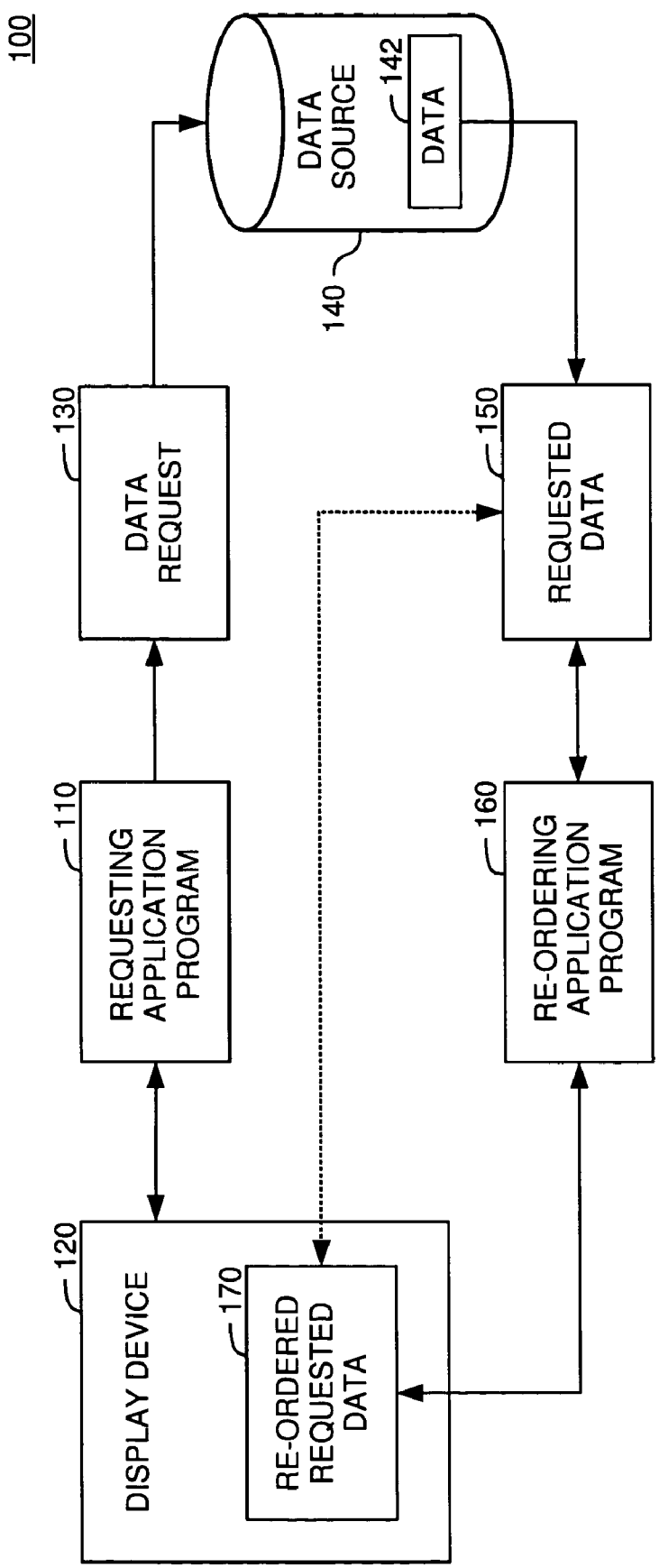
FIG. 1A is a data processing system illustratively utilized in accordance with the invention.

The present invention is generally directed to a method, system and article of manufacture for managing presentation of data on a display device and, more particularly, for managing presentation of data in a tabular form on a display device. According to one aspect, data in a tabular form having a plurality of columns and rows is received from a data source in response to a request for the data. The received data is ordered according to an initial order. Specifically, the columns and rows in the received data are ordered according to the initial order. In one embodiment, the columns and/or rows of the received data are then re-ordered. The re-ordering is done on the basis of predefined rules configured to intelligently arrange presentation of the received data to a user. Thus, potentially critical data in the received data can be determined and emphasized. More specifically, the rules can be applied to the received data in order to determine weightings for each column and/or each row of the plurality of columns and rows. By way of example, the weightings are determined on the basis of metadata describing an organizational structure of the received data in the data source, statistical information associated with the received data in the data source, attributes of the request for the data, historical information concerning the received data, and/or properties of the received data. The re-ordered received data is then output for display on the display device.

It is noted that particular embodiments described herein may refer to managing presentation of specific received data. For example, embodiments may be described with reference to managing presentation of query results obtained in response to execution of queries against databases. However, references to managing presentation of query results are merely for purposes of illustration and not limiting of the invention. More broadly, managing presentation of any suitable data received in a tabular form in response to a request for the data (whether or not the request be a query, per se) is contemplated.

In various embodiments, the invention provides numerous advantages over the prior art. According to aspects of the invention, an order in which columns appear in a query result in a tabular form is autonomically determined. To this end, database metadata is used in one embodiment to determine the order of the columns in the query result. Thus, for instance any column with an index built over it can be arranged to appear towards the beginning of the query result table. Furthermore, any column with a referential constraint or check constraint can be arranged to appear at the beginning. Any columns associated with triggers could also be arranged to appear at the beginning. However, excessively long fields such as COMMENT fields that are usually defined by large VARCHAR fields could be arranged to appear at the end of the table. In another embodiment, database statistics can be used to determine the order of the columns in the query result. For example, the database statistics can be used to determine which columns are frequently selected together, which columns can then be grouped and displayed together on the display device. In another embodiment, if the data in a column includes only very few values, most of which are null, and none of which includes a data abnormality, the column could be moved to the end of the query result table. In still another embodiment, if temporary indexes have previously been created on a column, the column could be listed at the beginning of the table. Furthermore, a physical location of columns in a table could be used to order the query result. In other words, the first columns of each table being viewed frequently could be given precedence over table columns found later in the files. This is meaningful because normally database designers have key information stored up at the beginning of database tables, followed by the critical data, and columns at the end of tables are often defined to fill out the rest of the record. In another embodiment, if a column in a spreadsheet has previously been hidden, it can be arranged to the end of the query result table and if the column has previously been sorted on, it can be listed at the beginning of the table.

Data Processing Environment

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Embodiments of the invention can be implemented in a hardware/software configuration including at least one networked client computer and at least one server computer, although the client-server model is merely illustrative, and not limiting of the invention. Furthermore, embodiments of the present invention can apply to any comparable hardware configuration, regardless of whether the computer systems are complicated, multi-user computing apparatuses, single-user workstations, or network appliances that do not have non-volatile storage of their own. Further, it is understood that while reference may be made to particular query languages, including SQL, the invention is not limited to a particular language, standard or version. Accordingly, persons skilled in the art will recognize that the invention is adaptable to other query languages and that the invention is also adaptable to future changes in a particular query language as well as to other query languages presently unknown.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

Referring now to FIG. 1A, a block diagram of one embodiment of a data processing system 100 is illustrated. The data processing system 100 illustratively includes a requesting application program 110, a display device 120, a data source 140 and a re-ordering application program 160. The data source 140 is representative of any collection of data regardless of the particular physical representation. By way of illustration, the data source 140 may be a database organized according to a relational schema (accessible by SQL queries) or according to an XML schema (accessible by XML queries). However, the invention is not limited to a particular physical representation or schema and contemplates extension to schemas presently unknown. As used herein, the term "schema" generically refers to a particular arrangement of data.

According to one aspect, the requesting application program 110 (and more generally, any requesting entity including, at the highest level, users) issues data requests, such as data request 130, against the data source 140. The data request 130 issued by the requesting application program 110 may be predefined (i.e., hard coded as part of the application 110) or may be generated in response to input (e.g., user input).

Illustratively, the requesting application program 110 issues the data request 130 against the data 142 of the data source 140. In response to the data request 130, requested data 150 is returned to a re-ordering application program 160. The re-ordering application program 160 is configured to manage presentation of the requested data 150 on the display device 120. To this end, the re-ordering application program 160 applies rules to the requested data 150 which are configured for intelligently arranging presentation of the requested data 150 to a user. As a result, according to one aspect, a re-ordering of the requested data 150 is performed and re-ordered requested data 170 is output. More specifically, the re-ordered requested data 170 is output by the re-ordering application program 160 to the display device 120 for display.

In one embodiment, the re-ordering is done by a client-side application (e.g., the re-ordering application program 160) and the requested data 150 is received from a server-side data source (e.g., the data source 140). However, it should be noted that alternative embodiments are contemplated. For instance, the re-ordering application program 160 and the data source 140 can be resident on a common computer system. Furthermore, the requesting application program 110 and the re-ordering application program can be implemented as a single, integrated software product resident at the server-side or the client-side.

Figure 1B:
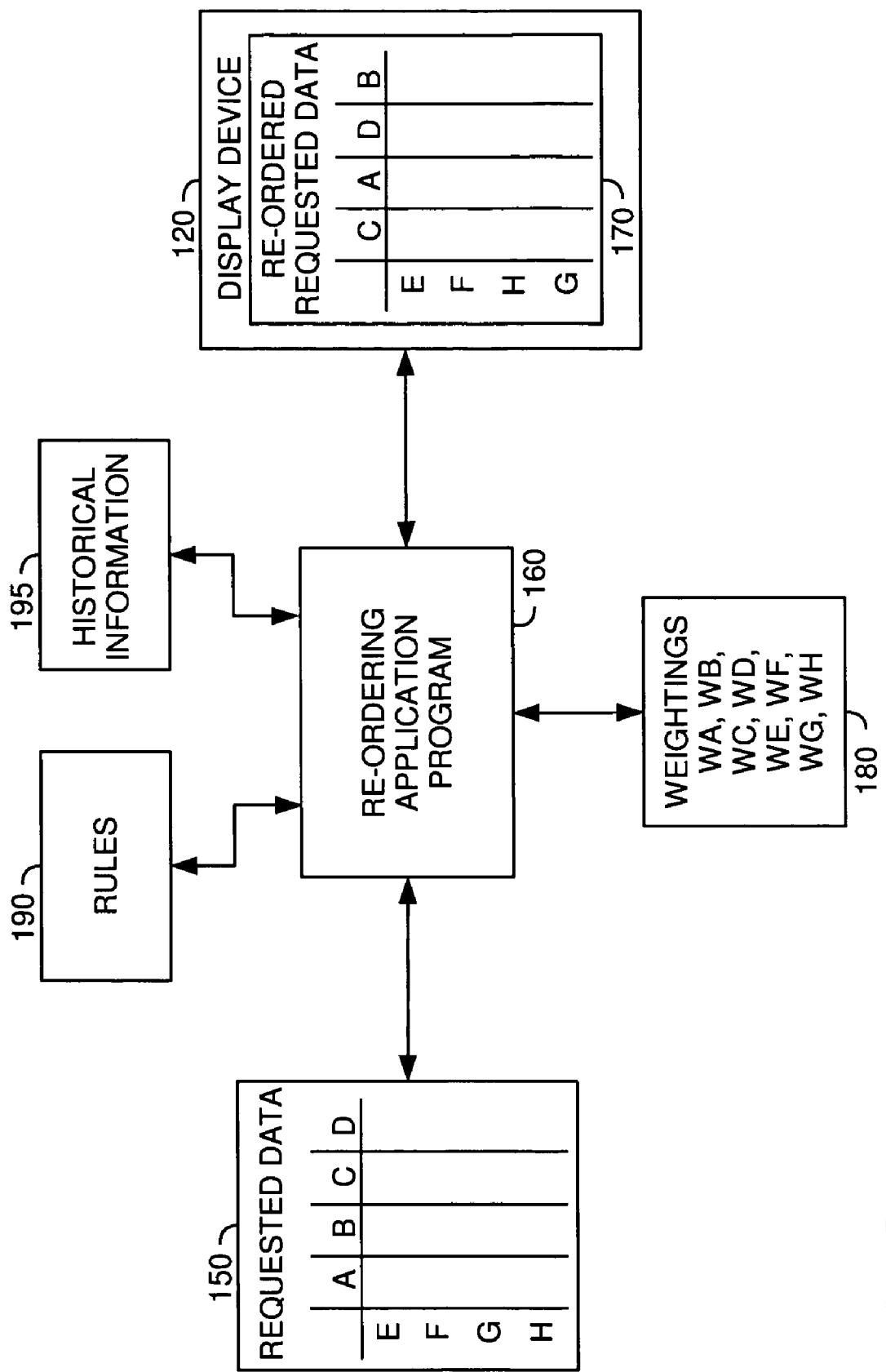
FIG. 1B is a relational view of software components in one embodiment.

Referring now to FIG. 1B, a software environment of the re-ordering application program 160 for re-ordering the requested data 150 is shown in more detail. According to one aspect, the requested data 150 is presented in a tabular form having a plurality of columns and rows. Illustratively, the plurality of columns includes columns "A", "B", "C" and "D", and the plurality of rows includes rows "E", "F", "G" and "H". By way of example, the plurality of columns is shown having an initial order "ABCD" and the plurality of rows is shown having an initial order "EFGH".

In one embodiment, the re-ordering application 160 takes the plurality of columns and rows as input and generates weightings 180 for all columns and/or rows. More specifically, the re-ordering application 160 applies rules 190 to the plurality of columns and rows for determining the weightings 180. Furthermore, the re-ordering application 160 may apply the rules 190 to the data source 140 and/or the data request 130 to determine or adjust the weightings 180. In various embodiments, the weightings 180 can be determined on the basis of metadata describing an organizational structure of the requested data 150 in the data source 140, statistical analysis information generated for the requested data 150 in the data source 140, attributes of the data request 130, historical information 195 concerning the requested data 150, and/or properties of the requested data 150. An exemplary embodiment of an operation for determining the weightings 180 on the basis of the historical information 195 is described below with reference to FIGS. 6-7.

Illustratively, for the columns "A", "B", "C" and "D" the weightings "WA", "WVB", "WC" and "WD" are generated and for the rows "E", "F", "G" and "H" the weightings "WE", "WF", "WG" and "WH" are generated. The weightings 180 can then be used as a basis for re-ordering the columns "A", "B", "C" and "D" and/or the rows "E", "F", "G" and "H" of the requested data 150 according to the rules 190. According to one aspect, the plurality of columns can be re-ordered such that columns having higher weightings are arranged at the beginning of the re-ordered requested data 170. Columns having lower weightings can be arranged at the end of the re-ordered requested data 170. The plurality of rows can be re-ordered in a similar manner. By way of example, assume a descending column weighting of "CADB" and a descending row weighting of "EFHG". Accordingly, the columns "A", "B", "C" and "D" of the requested data 150 can be re-ordered such that these columns have the order "CADB" in the re-ordered requested data 170. The rows "E", "F", "G" and "H" can be re-ordered such that these rows have the order "EFHG" in the re-ordered requested data 170. After re-ordering the columns and/or rows, the re-ordering application program 160 outputs the re-ordered requested data 170 to the display device 120 for display. Operation of the re-ordering application program 160 is explained in more detail below with reference to FIGS. 2-8.

Figure 2:
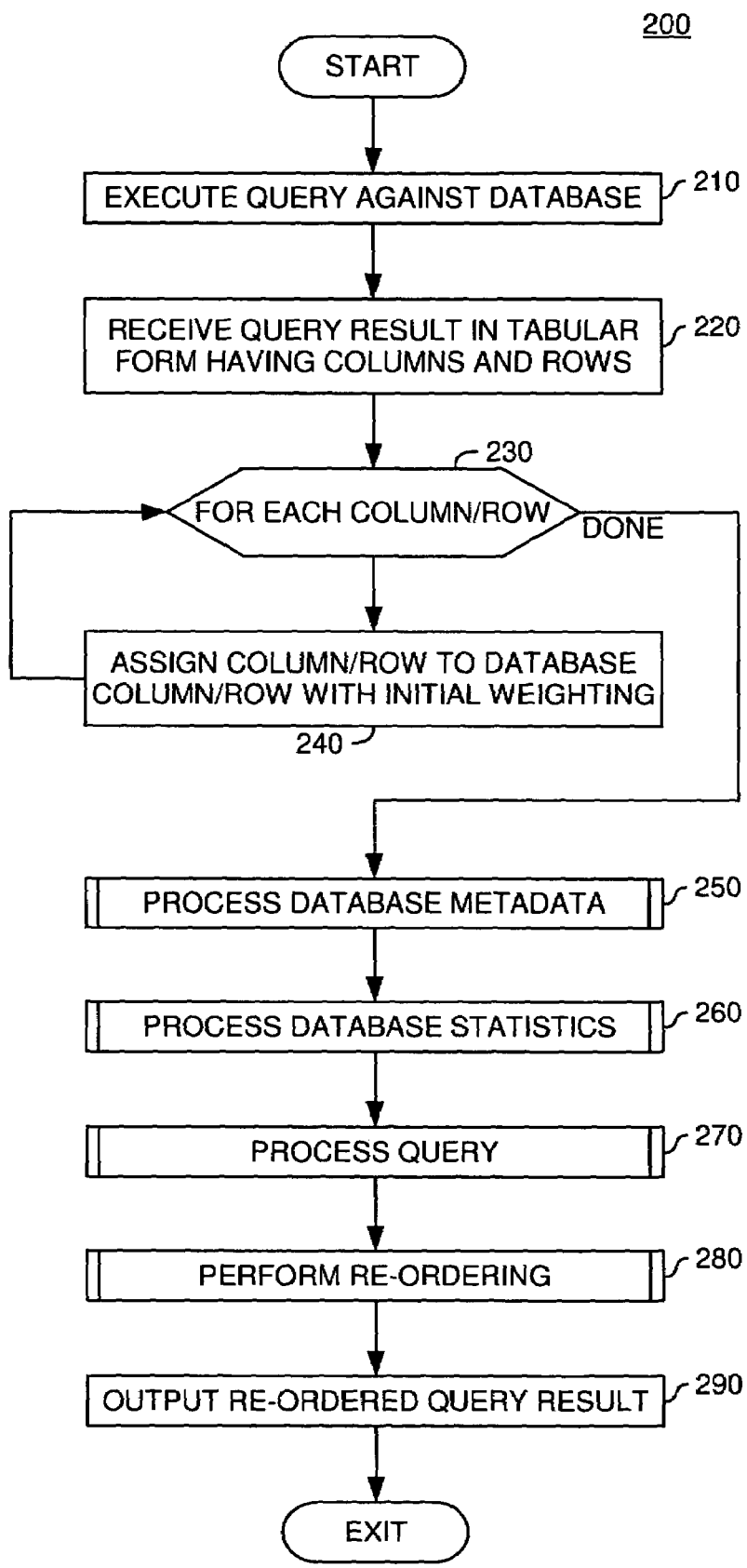
FIG. 2 is a flow chart illustrating presentation management of a query result in one embodiment.

Referring now to FIG. 2, one embodiment of a method 200 for managing presentation of requested data (e.g., requested data 150 of FIG. 1A) on a display device (e.g., display device 120 of FIG. 1A) is shown. For purposes of illustration, the method 200 is explained with respect to a data request being implemented as a query against data of a database (e.g., data 142 of data source 140 of FIG. 1A). Accordingly, the requested data corresponds to a query result obtained in response to execution of the query. The query is issued by an issuing entity (e.g., requesting application program 110 of FIG. 1A). At least part of the steps of the method 200 can be performed by a re-ordering application program (e.g., re-ordering application program 160 of FIG. 1A). Method 200 starts at step 210.

At step 210, the query is received and executed against the database. At step 220, the query result is received. In one embodiment, the query result is in a tabular form having a plurality of columns and rows. At step 230, a loop consisting of steps 230 and 240 is entered for each column and row of the plurality of columns and rows. At step 240, each column and row of the query result is assigned to a corresponding column of a database which returned the column/row in response to the query. More specifically, each column and row is assigned to one or more columns in corresponding database(s). Furthermore, an initial weighting (e.g., weightings 180 of FIG. 1B) is associated with each column and row. When the loop consisting of steps 230 and 240 has been executed for each column and row, processing continues at step 250.

While the loop consisting of steps 230 and 240 has been described above with respect to each column and row of the query result, it should be noted that the loop can also be performed only with respect to the columns or only with respect to the rows. Therefore, in the following, reference is made to processing of the columns of the query result for brevity. However, it should be noted that the described processing can also be applied to the rows of the query result.

The initial weightings are adjusted at steps 250–280 according to rules (e.g., rules 190 of FIG. 1B) which are configured for intelligently re-ordering the plurality of columns. More specifically, these rules are adapted to adjust the weightings of the columns according to whether a corresponding column is estimated to be of interest to a user. Thus, the columns can be re-ordered in accordance with the rules on the basis of their corresponding weightings. In other words, when a given column is estimated not to be of potential interest to the user, the weighting of the given column is adjusted down, i.e., the weighting is decreased. However, when a given column is estimated potentially to be of potential interest to the user, the weighting of the given column is adjusted up, i.e., the weighting is increased. The weighting can be increased or decreased by a predefined value, which may be user-specific or application-specific. For brevity, if in the following explanations reference is made to adjusting the weighting down, it is assumed that the corresponding column is estimated not to be of interest to the user. Furthermore, if in the following explanations reference is made to adjusting the weighting up, it is assumed that a corresponding column is estimated to be of interest to the user.

At step 250, database metadata is processed. The database metadata is used to adjust the initial weightings associated with the columns of the plurality of columns. In one embodiment, the database metadata describes an organizational structure of the database(s) columns from which the query result is returned. Accordingly, the metadata may describe column types, physical attributes of columns, an amount of space assigned per column (e.g., how many characters a column may contain), etc. The database metadata can be determined from the database(s), i.e., the tables columns in the database(s) from which the query result was returned. Furthermore, the determined database metadata may include metadata which is related to all columns of the plurality of columns from which the result was returned, or to a subset of the columns. An exemplary operation 300 for processing database metadata is described in more detail with reference to FIGS. 3A–B.

Figure 3A:
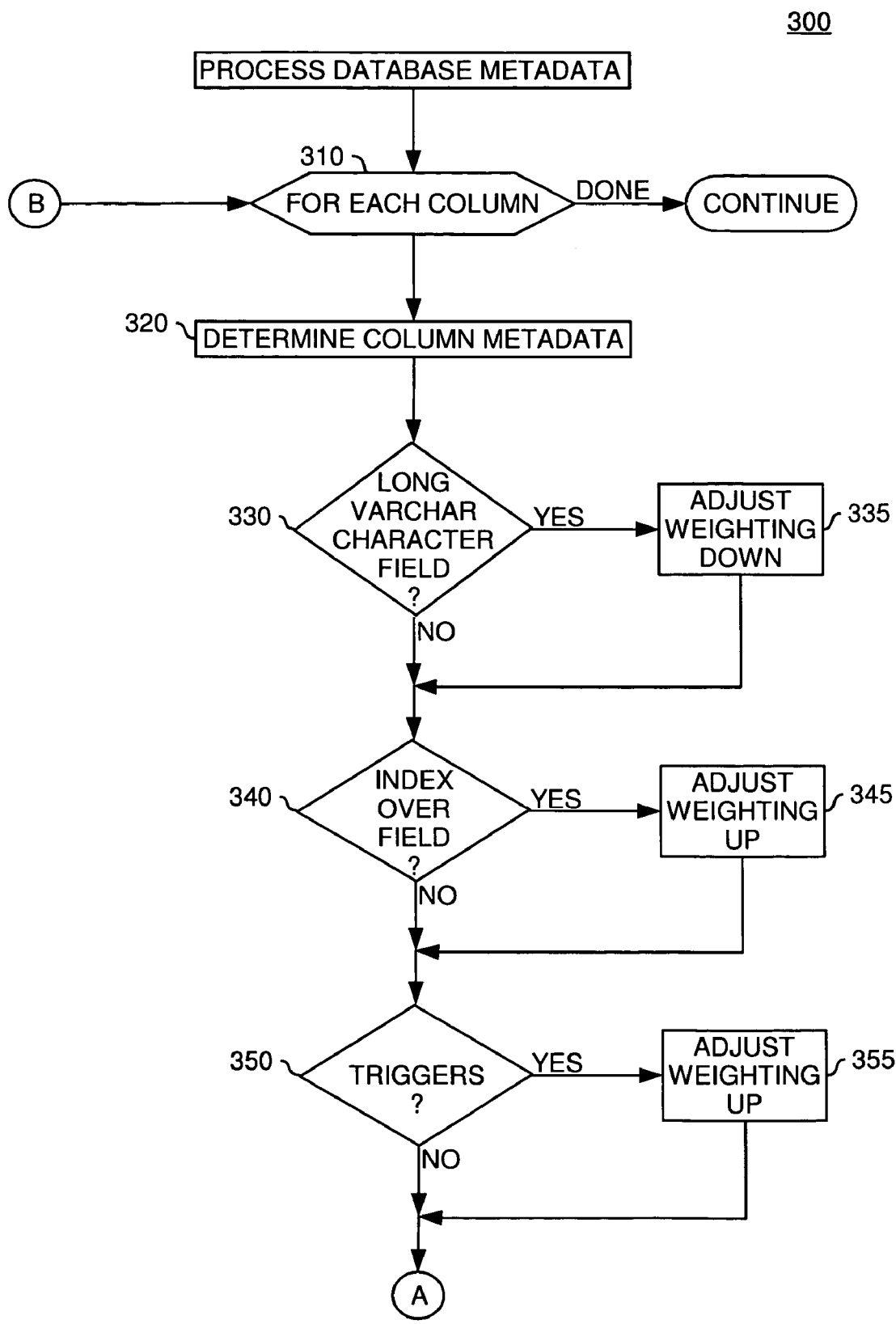
FIGS. 3A–B are flow charts illustrating database metadata processing in one embodiment.
Figure 3B:
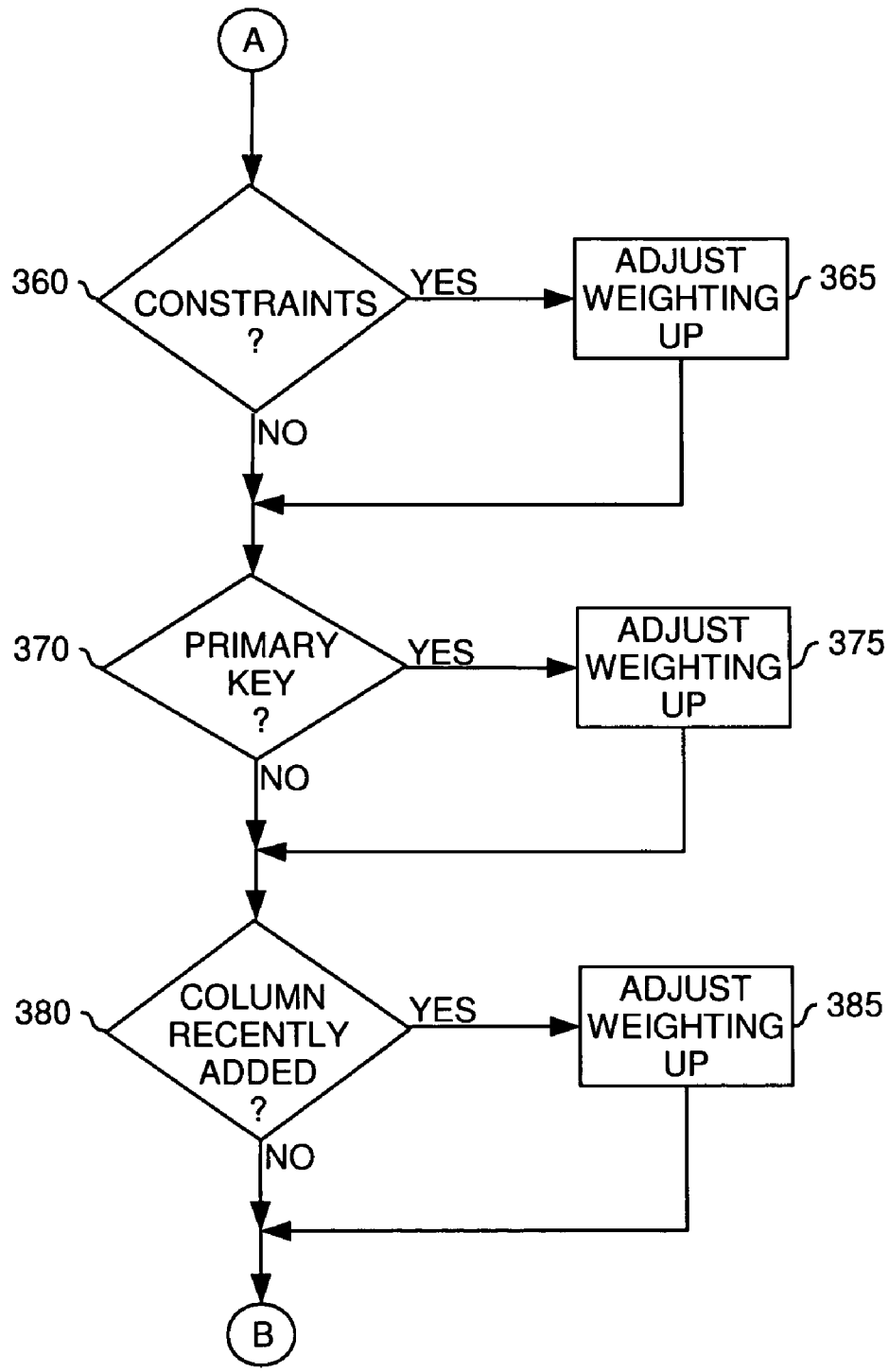

Referring now to FIGS. 3A–B, the exemplary operation 300 starts at step 310. At step 310, a loop consisting of steps 310–385 is entered for each column of the plurality of columns. At step 320, metadata for a given column is determined from a corresponding database. The determined metadata is then used in steps 330–385 to perform a sequence of determinations, each of which results in an adjustment of the weighting for the given column.

At step 330, it is determined whether a LONG VARCHAR character code set is used in the given column. If the given column does not use a LONG VARCHAR code set, processing continues at step 340. If, however, a LONG VARCHAR character code set is used in the given column, it can for instance be assumed that the given column contains some text of low interest to the user, such as a general description or general comments. Therefore, the weighting of the given column is adjusted down at step 335. Processing then continues at step 340.

At step 340, it is determined whether an index such as a bitmap index or an encoded vector index exists over the given column. If the given column is not indexed, processing continues at step 350. If, however, an index exists over the given column, it can be assumed that the index has been created to accelerate querying the given column, which can for instance be desirable in cases where the given column is frequently queried. It can further be assumed that a column which is frequently queried is of potential interest to the user. Therefore, the weighting of the given column is adjusted up at step 345. Processing then continues at step 350.

At step 350, it is determined whether one or more triggers exist for the given column. If no trigger(s) exists, processing continues at step 360. If, however, one or more triggers for the given column exist, it can be assumed that the given column contains content which is of potential interest to the user as the given column is monitored using the trigger(s). Therefore, the weighting of the given column is adjusted up at step 355. Processing then continues at step 360.

At step 360, it is determined whether one or more constraints, such as referential constraints or check constraints, exist for the given column. If no constraint(s) exists, processing continues at step 370. If, however, one or more constraints for the given column exist, it can be assumed that the given column is of potential interest to the user, as the one or more constraints define which data is to be returned from the database(s) as the query result. Therefore, the weighting of the given column is adjusted up at step 365. Processing then continues at step 370.

At step 370, it is determined whether a primary key exists for the given column. If no primary key exists, processing continues at step 380. If, however, a primary key for the given column exists, the primary key indicates that the given column contains key information which is suitable to uniquely identify data records in the given column. Thus, it can be assumed that the given column is of potential interest to the user and, therefore, the weighting of the given column is adjusted up at step 375. Processing then continues at step 380.

At step 380, it is determined whether the given column has recently been added to the corresponding table in the database. Determining whether the given column has recently been added can be performed, for instance, by comparing a timestamp indicating a time when the column has been added to a predetermined threshold value. If the column has not been added recently, processing returns to step 310. If, however, the column has recently been added, it can be assumed that the user (or a database administrator) considered that the given column contains content which needed to be added to the database(s) and which may consequently be of potential interest to the user. Therefore, the weighting of the given column is adjusted up at step 385. Processing then returns to step 310, where the loop consisting of steps 310–385 is entered for a next column of the plurality of columns. When all columns of the plurality of columns have been processed according to the operation 300, processing continues at step 260 of FIG. 2.

It should be noted that the metadata described with respect to steps 330, 340, 350, 360, 370 and 380 is merely illustrative. Other metadata can be determined and used to adjust the weightings of the columns of the query result. For instance, metadata describing whether one or more of the plurality of columns are hidden or have been sorted in the database tables can be determined. Thus, extension to such other metadata is broadly contemplated.

Referring now back to FIG. 2, at step 260 database statistics are processed. The database statistics are used to further adjust the weightings associated with the columns of the query result. In one embodiment, the database statistics describe statistical aspects of the columns of the query result with respect to the database(s), from which they have been returned. More specifically, the statistical information may result from a statistical analysis of all columns, a subset of the columns or -content of the columns. The statistical information can be determined from the database(s), i.e., the tables in the database(s) from which the columns of the query result have been returned. In one embodiment, the statistical information is determined on the basis of database log files and/or from indexes and encoded vector indices (EVIs). Generally, a log file is a file in which information related to activities of a data processing system is recorded, such as information related to user sessions, data exchange operations and network activities. Specific log files may relate to predefined specific activities. For instance, database log files may relate to activities with respect to one or more databases and record, for example, information related to queries and query results. An exemplary operation 400 for processing statistical information is described in more detail with reference to FIG. 4.

Figure 4:
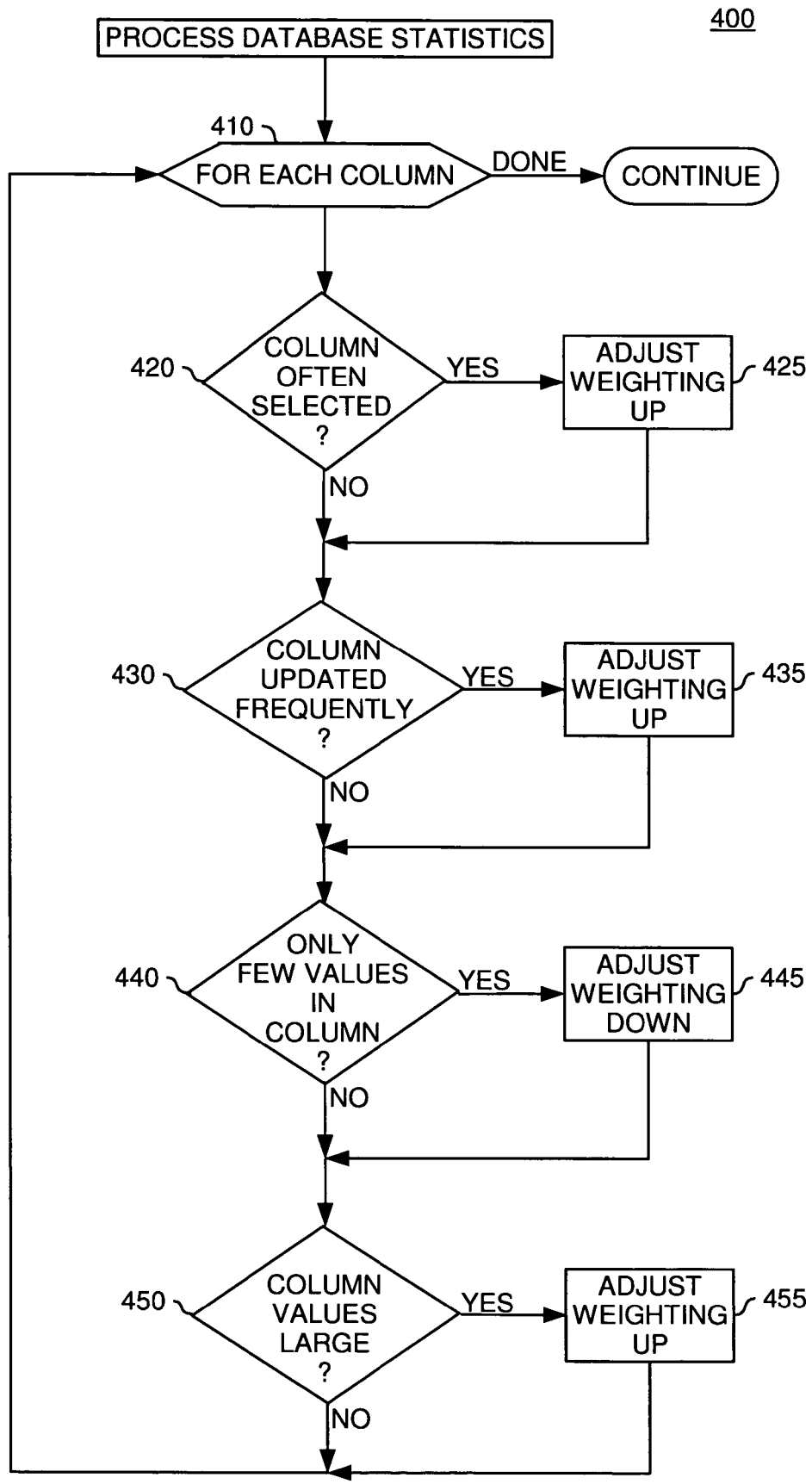
FIG. 4 is a flow chart illustrating database statistics processing in one embodiment.

Referring now to FIG. 4, the exemplary operation 400 starts at step 410. At step 410, a loop consisting of steps 410–455 is entered for each column of the plurality of columns.

At step 420, it is determined for a given column whether the given column is selected frequently. This determination can be performed by comparing a number of selections, which can be determined from corresponding log files, to a predetermined threshold value. If the given column is not frequently selected, processing continues at step 430. If, however, the given column is frequently selected, this indicates that the given column is frequently queried and it can be assumed that a column which is frequently queried is of potential interest to the user. Therefore, the weighting of the given column is adjusted up at step 425. Processing then continues at step 430.

At step 430, it is determined whether the given column is frequently updated. This determination can be performed by comparing a number of updates, which can also be determined from corresponding log files, to a predetermined threshold value. If the given column is not frequently updated, processing continues at step 440. If, however, the given column is frequently updated, this indicates that the given column is frequently used by the user(s) and it can be assumed that a column which is frequently used/accessed is of potential interest to the user. Therefore, the weighting of the given column is adjusted up at step 435. Processing then continues at step 440.

At step 440, it is determined whether the given column contains only few values. This determination can be performed by comparing a determined number of values to a predetermined threshold value. If the given column does not contain few values, processing continues at step 450. If, however, the given column contains only a few values, it can for instance be assumed that the given column contains data which can be entered optionally by the user(s). However, a column with optional data can be assumed to be of low interest to the user. Therefore, the weighting of the given column is adjusted down at step 445. Processing then continues at step 450.

At step 450, it is determined whether the given column contains a large number of unique values. This determination can be performed by comparing a determined number of unique values to a predetermined threshold value. If the given column does not contain a large number of unique values, processing returns to step 410. If, however, the given column contains a large number of unique values, it can be assumed that the given column contains information which should be brought to the attention of the user. Therefore, the weighting of the given column is adjusted up at step 455. Processing then returns to step 410, where the loop consisting of steps 410–455 is entered for a next column of the plurality of columns. When all columns of the plurality of columns have been processed according to the operation 400, processing continues at step 270 of FIG. 2.

It should be noted that the statistical information described with respect to steps 420, 430, 440 and 450 are merely illustrative. Other statistical information can be determined and used to adjust the weightings of the columns of the query result. For instance, physical locations of one or more of the plurality of columns can be determined. Furthermore, instead of determining the statistical information for a single user, they can be determined for a plurality of users based on corresponding log files. Thus, extension to such other statistical information is broadly contemplated.

Referring now back to FIG. 2, at step 270 the query itself is processed to further adjust the weightings associated with the columns of the query result. More specifically, the query is processed to determine attributes of the query, such as query conditions. The attributes of the query are then examined with respect to each column of the plurality of columns. An exemplary operation 500 for processing a query is described in more detail with reference to FIG. 5.

Figure 5:
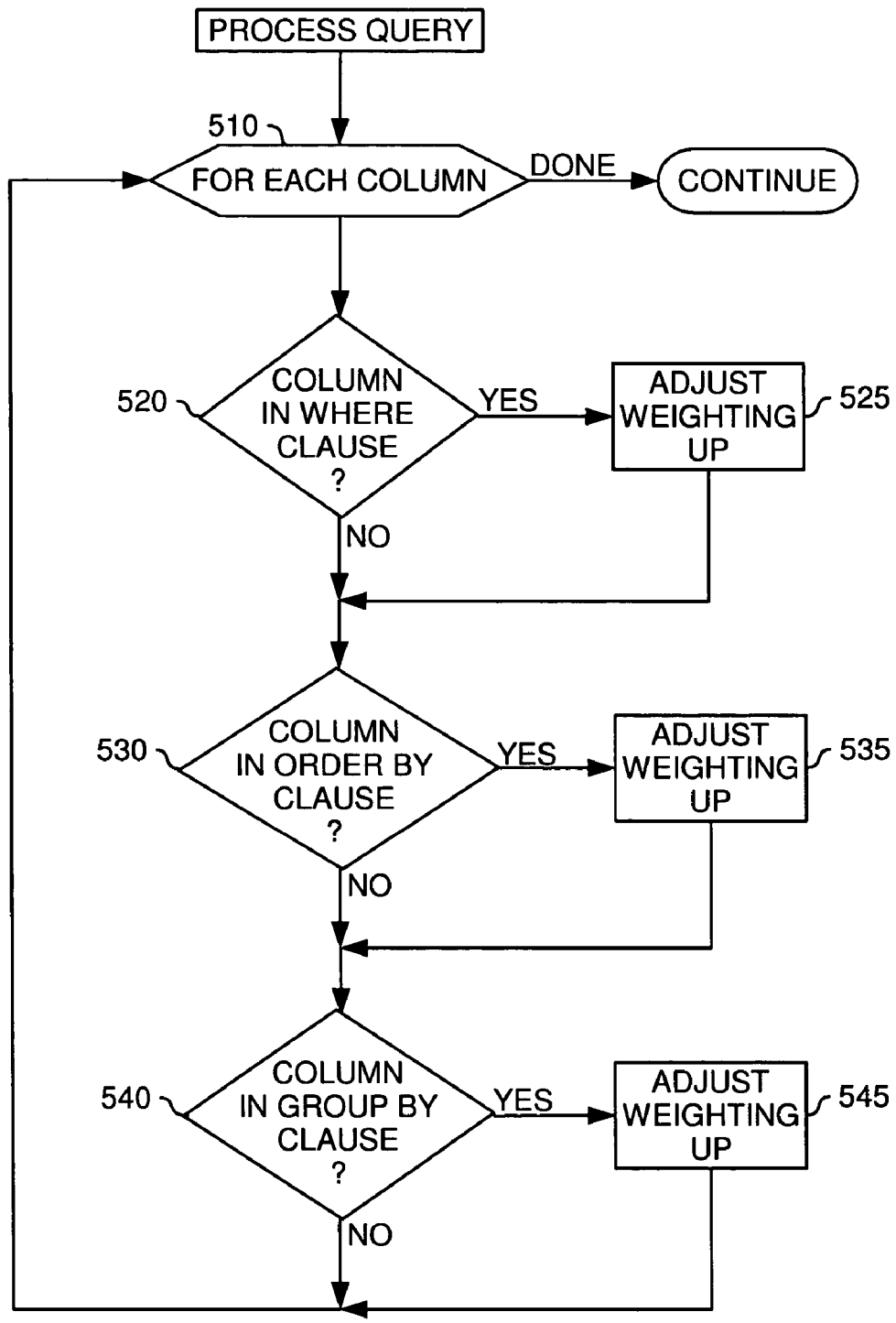
FIG. 5 is a flow chart illustrating query processing in one embodiment.

Referring now to FIG. 5, the exemplary operation 500 starts at step 510. At step 510, a loop consisting of steps 510–545 is entered for each column of the plurality of columns from which the query result is returned. For purposes of illustration, the loop consisting of steps 510–545 is explained with reference to an SQL query.

At step 520, it is determined whether a given column is included in a WHERE clause of the SQL query. If the given column is not included in a WHERE clause of the SQL query, processing continues at step 530. If, however, the given column is included in a WHERE clause, this indicates that the given column is used to define the query result. Therefore, it can be assumed that the given column is of potential interest to the user and, consequently, the weighting of the given column is adjusted up at step 525. Processing then continues at step 530.

At step 530, it is determined whether the given column is included in an ORDER BY clause of the SQL query. If the given column is not included in an ORDER BY clause of the SQL query, processing continues at step 540. If, however, the given column is included in an ORDER BY clause, this indicates that the given column is used to order the query result according to data contained in the given column. Therefore, it can be assumed that the given column is of potential interest to the user and, consequently, the weighting of the given column is adjusted up at step 535. Processing then continues at step 540.

At step 540, it is determined whether the given column is included in a GROUP BY clause of the SQL query. If the given column is not included in a GROUP BY clause of the SQL query, processing returns to step 510. If, however, the given column is included in a GROUP BY clause, this indicates that the given column is used to group the query result according to the data contained in the given column. Therefore, it can be assumed that the given column is of potential interest to the user and, consequently, the weighting of the given column is adjusted up at step 545. Processing then returns to step 510, where the loop consisting of steps 510–545 is entered for a next column of the plurality of columns. When all columns of the plurality of columns have been processed according to the operation 500, processing continues at step 280 of FIG. 2.

As already mentioned above, the steps 520, 530 and 540 have been described by way of example with respect to a SQL query. However, these steps may vary depending on a selected type of query language or, more generally, a selected type of data request. Accordingly, extension to other query languages and data requests is broadly contemplated.

Referring now back to FIG. 2, at step 280 the plurality of columns of the query result is re-ordered based on the adjusted weightings. An exemplary operation 600 for re-ordering the query result is described in more detail with reference to FIG. 6.

Figure 6:
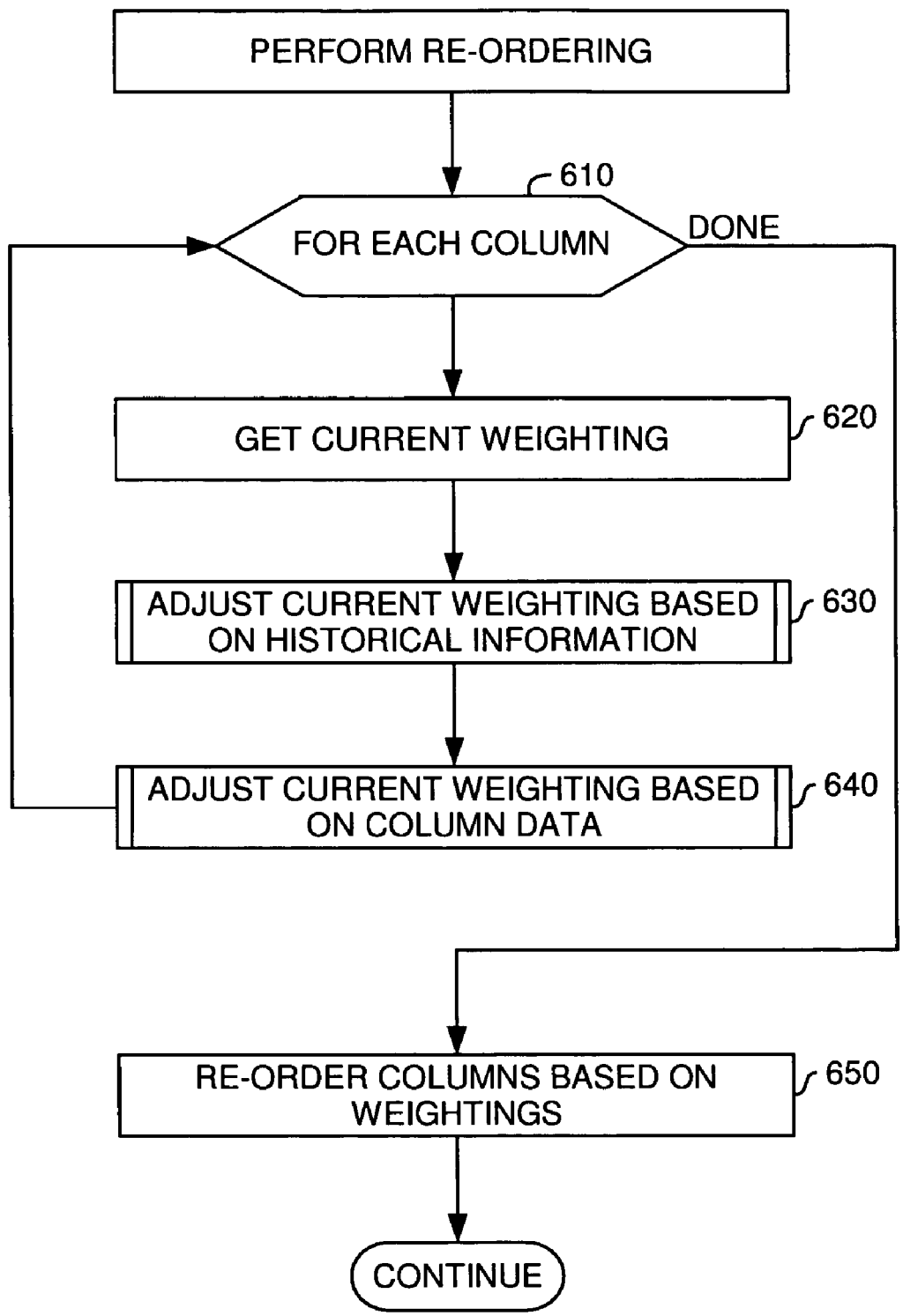
FIG. 6 is a flow chart illustrating a column re-ordering process in one embodiment.

Referring now to FIG. 6, the exemplary operation 600 starts at step 610. In one embodiment, a loop consisting of steps 610–640 is entered at step 610 for each column of the plurality of columns. This loop is configured to allow for a re-adjustment of the adjusted weightings.

At step 620, a current weighting of a given column is determined. At step 630, the current weighting of the given column is adjusted based on historical information (e.g., historical information 195 of FIG. 1B). Historical information is information that describes user behavior of the user or other users with respect to queries and query results. The historical information can be determined on the basis of how a user(s) previously interacted with a column(s). An exemplary operation 700 for processing historical information is described in more detail with reference to FIG. 7.

Figure 7:
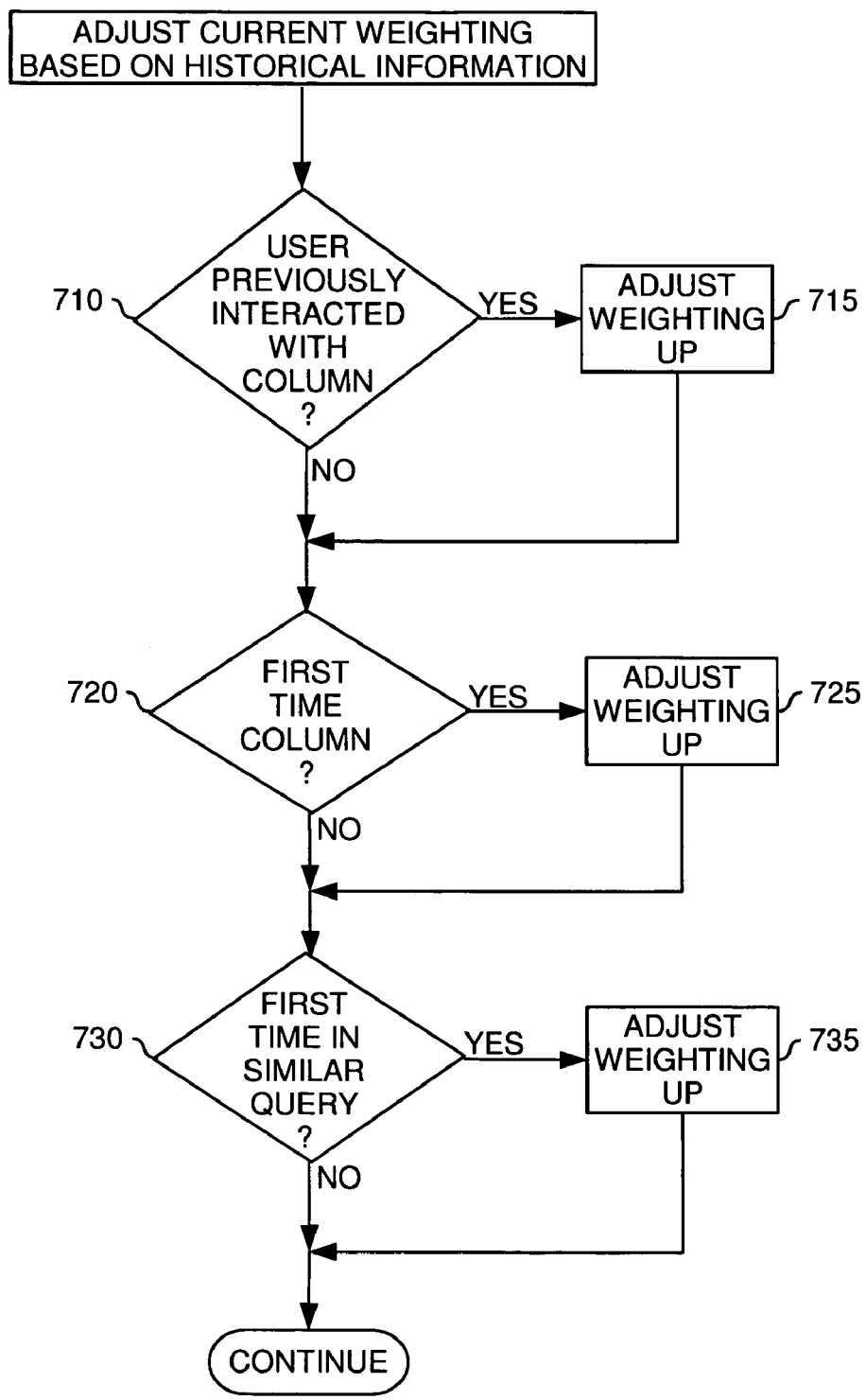
FIGS. 7 and 8A–B are flow charts illustrating weight re-adjustment processes in one embodiment.

Referring now to FIG. 7, the exemplary operation 700 starts at step 710. At step 710, it is determined whether the user previously interacted with the given column. For instance, it can be determined whether the user previously updated or inserted the given column. If the user did not previously interact with the given column, processing continues at step 720. If, however, the user previously interacted with the given column, this indicates a previous interest of the user in the given column. Therefore, the weighting of the given column is adjusted up at step 715. Processing then continues at step 720.

At step 720, it is determined whether the user selected the given column for the first time or whether the user previously selected the given column. More specifically, it is determined whether the user previously selected the given column for display in a query result. This determination can also be performed using corresponding log files. If the user did not previously select the given column, processing continues at step 730. If, however, the user previously selected the given column, this indicates a previous interest of the user in the given column. Therefore, the weighting of the given column is adjusted up at step 725. Processing then continues at step 730.

At step 730, it is determined whether the given column has been previously requested for a query similar to the current query. This determination can again be performed using corresponding log files. If the given column has been requested previously in one or more similar queries, processing continues at step 640 of FIG. 6. If, however, the given column has never been requested previously, it can be assumed that the user is not aware of data contained in the given column. Therefore, the weighting of the given column is adjusted up at step 735. Processing then continues at step 640 of FIG. 6.

Referring now back to FIG. 6, at step 640 the current weighting of the given column is adjusted based on column-related data. Column-related data is information which indicates properties of each column in the query result as well as inter-column relationships, i.e. properties of a given column with respect to other columns in the query result. In one embodiment, the column-related data can be obtained by an analysis of all columns of the query result separately and with respect to each other. An exemplary operation 800 for processing column-related data is described in more detail with reference to FIGS. 8A–B.

Figure 8A:
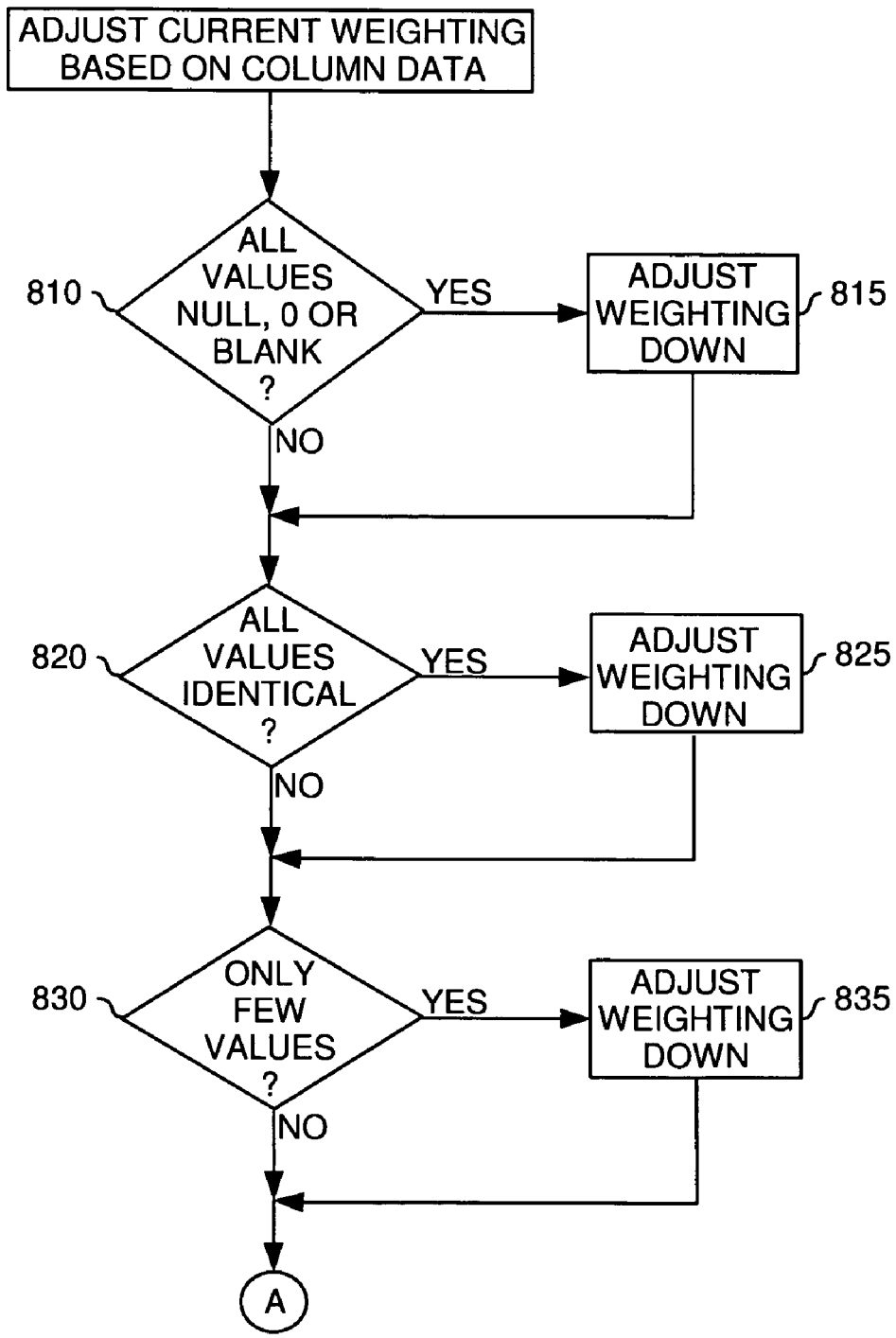
Figure 8B:
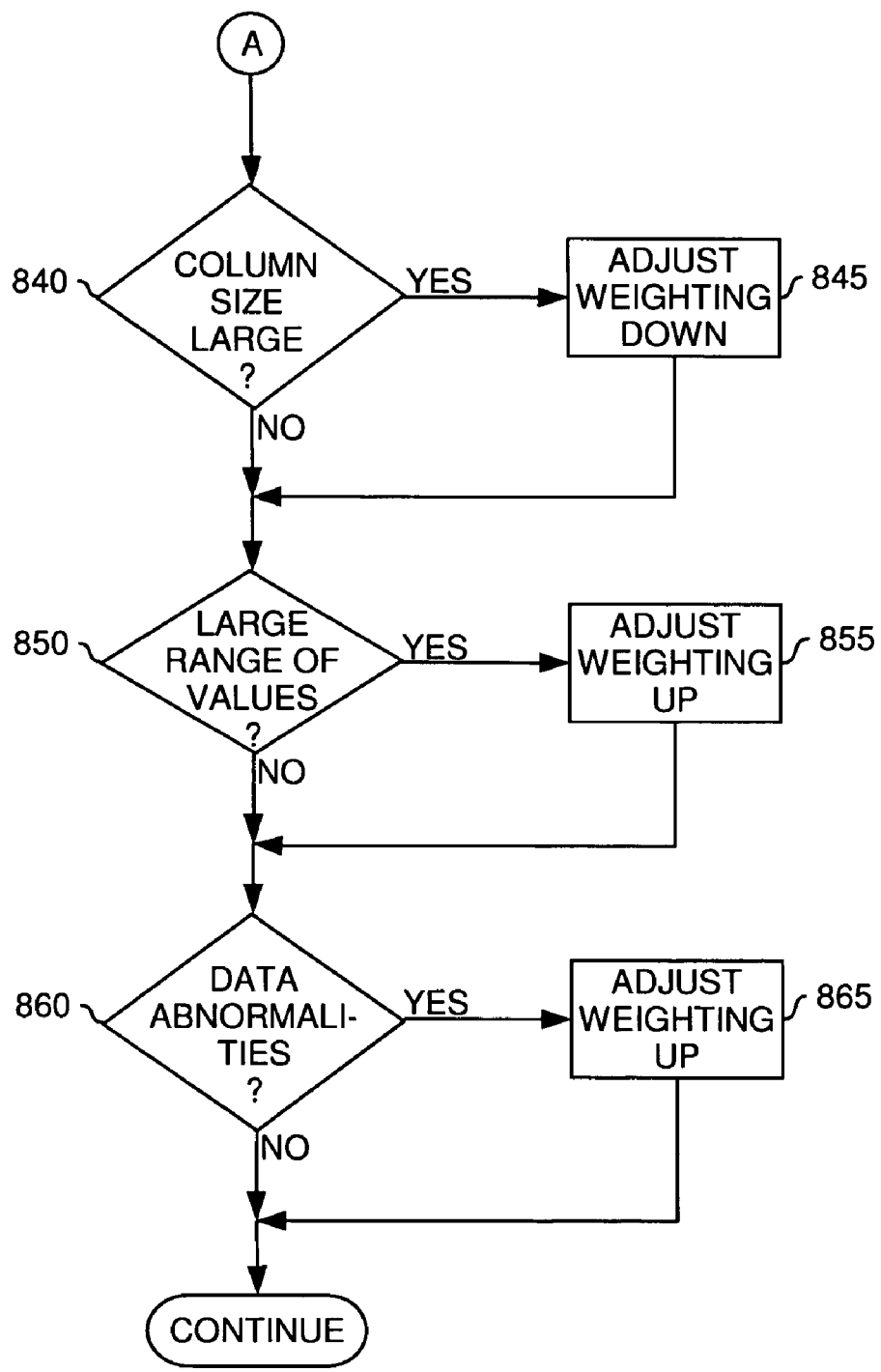

Referring now to FIGS. 8A–B, the exemplary operation 800 starts at step 810. At step 810, it is determined whether all values in the given column are null, 0 or blank. If the values in the given column include values that are not null, 0 or blank, processing continues at step 820. If, however, all values in the given column are null, 0 or blank, it can be assumed that the given column does not contain any meaningful information. Therefore, it can be assumed that the given column is of low interest to the user and, consequently, the weighting of the given column is adjusted down at step 815. Processing then continues at step 820. In one embodiment, the number of values that are null, 0 or blank can be compared at step 810 with a predetermined threshold. In this case, if the number of values does not exceed the predetermined threshold, processing continues at step 820.

At step 820, it is determined whether all values in the given column are identical. If not all values in the given column are identical, processing continues at step 830. If, however, all values in the given column are identical, it can again be assumed that the given column does not contain meaningful information. Therefore, it can be assumed that the given column is of low interest to the user and, consequently, the weighting of the given column is adjusted down at step 825. Processing then continues at step 830. In one embodiment, the number of values that are identical can be compared at step 820 with a predetermined threshold. In this case, if the number of values does not exceed the predetermined threshold, processing continues at step 830.

At step 830, it is determined whether the given column contains only few values. This determination can be performed by comparing a determined number of values to a predetermined threshold. If the given column does not contain few values, processing continues at step 840. If, however, the given column contains only few values, it can be assumed that other columns in the query result may contain data which is of higher interest to the user. Therefore, the weighting of the given column is adjusted down at step 835. Processing then continues at step 840.

At step 840, it is determined whether the given column has a size which is relatively large. By way of example, this determination can be made by determining a number of characters allowed within each data field of the given column. Furthermore, this determination can be made by comparing the given column to other columns of the query result to determine a relative size of the given column. If the given column has a size which is not relatively large, processing continues at step 850. If, however, the given column has a size which is relatively large, it can for instance be assumed that the given column contains some text of low interest to the user, such as a general description or general comments. Therefore, the weighting of the given column is adjusted down at step 845. Processing then continues at step 850.

At step 850, it is determined whether the given column includes a large range of values. In one embodiment, this determination can be made by determining a total number of values or different values contained in the given column and comparing that total to a predefined threshold. If the given column does not include a large range of values, processing continues at step 860. If, however, the given column includes a large range of values, it can be assumed that the given column contains information which can be used to characterize the query result. Therefore, it can be assumed that the given column is of potential interest to the user and, consequently, the weighting of the given column is adjusted up at step 855. Processing then continues at step 860. In one embodiment, the range of values can be compared at step 850 with a predetermined threshold. In this case, if the range of values does not exceed the predetermined threshold, processing continues at step 860.

At step 860, it is determined whether the given column includes data abnormalities. A data abnormality occurs when a given value is significantly different to other values. Accordingly, an abnormality can be identified by comparing all values contained in the given column to each other. For instance, assume a column having a total of 10 values in which 9 values are in the interval [5; 10] and only 1 value is 1.000.000. This latter value is significantly different to the other values. It should be noted that other data abnormalities can be determined, for instance, if most of the values in the given column contain only letters and a few values contain only numbers. Thus, alternative representations of data abnormalities are broadly contemplated. If the given column does not include data abnormalities, processing returns to step 610 of FIG. 6. If, however, the given column includes data abnormalities, the weighting of the given column is adjusted up at step 865. According to one aspect, all data abnormalities can be highlighted when displaying the re-ordered query result to draw the user's attention thereto. Processing then returns to step 610 of FIG. 6, where the loop consisting of steps 610–640 is entered for a next column of the plurality of columns.

However, it should be noted that the column-related data used in steps 810–855 is merely illustrative. Other column-related data can be determined and used to adjust the weightings of the columns of the query result. Thus, extension to such other column-related data is broadly contemplated.

Referring now back to FIG. 6, when the loop consisting of steps 610–640 has been executed for each column of the query result, processing continues at step 650. At step 650, the columns of the query result are re-ordered according to their weightings. Processing then continues at step 290 of FIG. 2, where the re-ordered query result is output for display on the display device, and processing exits.

It should be noted that the loop consisting of steps 610–640 can be considered as optional and may be omitted to accelerate re-ordering of the query result. However, as the loop consisting of steps 610–640 is configured to re-adjust the weightings which have been adjusted in FIGS. 3–5, omitting this loop may affect the accuracy of the re-ordered query result. More specifically, according to FIGS. 3–5 the initial weightings assigned at step 240 of FIG. 2 are adjusted using information which is available for the columns of the plurality of columns with respect to an input side of the method 200 of FIG. 2. In other words, all information used in FIGS. 3–5 can be determined from the query itself, the database(s) which returned the query result and corresponding log files. Accordingly, the weightings for the columns are adjusted in FIGS. 3–5 with respect to metadata for the columns in the database(s) which returned the query result, statistical information determined with respect to the database(s) and the data processing environment, and the query. However, according to FIGS. 3–5 no adjustments are performed in consideration of the content of the columns and inter-column relationships in the context of the query result. Furthermore, the query result itself in the context of other, similar query results has not been considered. For instance, assume a column in the query result which is estimated according to FIGS. 3–5 to be of low interest to the user. Thus, the initial weighting of this column would have been adjusted down in FIGS. 3–5 such that the column would be arranged somewhere at the end of the re-ordered query result after the processing according to FIGS. 3–5. Assume now that this column is frequently selected by other users using similar queries. In consideration of this aspect, it can be assumed that despite the assumptions and adjustments made in FIGS. 3–5 the column is also of potential interest to the user as the other users frequently select the column. Therefore, the weighting of the column should be re-adjusted up. This would be performed in the loop consisting of steps 610–640.

While the foregoing is directed to embodiments of the present invention, other and further embodiments of the invention may be devised without departing from the basic scope thereof, and the scope thereof is determined by the claims that follow.

What is claimed is:

1. A method of managing display of requested data on a display device, the method comprising:
   in response to a request for data, receiving the requested data in a tabular form having a plurality of columns and rows ordered according to an initial order, wherein the request for data is a query issued against a database and the requested data is a query result;
   determining, from the data source, metadata describing an organizational structure of the requested data, wherein the determined metadata includes metadata related to N columns of the plurality of columns, where N is an integer, and describes for each of the N columns at least one of:

(i) an index over the column;
(ii) a previously created temporary index over the column;
(iii) a referential constraint over the column;
(iv) a check constraint over the column;
(v) a key associated with the column;
(vi) a tripper associated with the column;
(vii) a point of time associated with creation of the column; and
(viii) a character code set used in the column;
re-ordering at least one of the columns and rows, wherein the re-ordering is done on the basis of rules configured to intelligently arrange presentation of the requested data to a user, and is performed on the basis of the determined metadata, and;
outputting the re-ordered requested data for display on the display device.

2. The method of claim 1, further comprising:
determining at least one of a weighting for each column and a weighting for each row of the plurality of columns and rows; and
wherein the re-ordering is performed on the basis of the determined weightings.

3. The method of claim 2, wherein the determined weightings are based on at least one of: (i) metadata describing an organizational structure of the requested data in the data source, (ii) statistical analysis information associated with the requested data in the data source, (iii) attributes of the request for data, (iv) historical information concerning the requested data, and (v) properties of the requested data.

4. The method of claim 1, further comprising:
determining data abnormalities in the requested data.

5. The method of claim 1, wherein the requested data is received from a server-side data source and the re-ordering is done by a client-side application.

6. The method of claim 1, wherein the re-ordering is done for emphasizing critical data.

7. The method of claim 1, wherein the determined metadata describes whether one or more of the plurality of columns and rows is hidden in the data source.

8. The method of claim 1 wherein the determined metadata describes whether one or more of the plurality of columns and rows has been sorted in the data source.

9. The method of claim 1, further comprising:
performing statistical analysis for the requested data to generate statistical information; and
wherein the re-ordering is performed on the basis of the statistical information.

10. The method of claim 9, wherein the statistical information describes for each column of N columns of the plurality of columns, where N is an integer:
(i) a frequency of display;
(ii) a frequency of selection;
(iii) a frequency of update;
(iv) a total number of contained values; and
(v) a number of unique contained values.

11. The method of claim 9, wherein the statistical information describes for each row of M rows of the plurality of rows, where M is an integer:
(i) a frequency of display;
(ii) a frequency of selection;
(iii) a frequency of update;
(iv) a total number of contained values; and
(v) a number of unique contained values.

12. The method of claim 9, wherein the statistical information describes physical locations in the data source.

13. The method of claim 1, further comprising:
determining attributes of the request for data; and
wherein the re-ordering is performed on the basis of the determined attributes.

14. The method of claim 13, wherein the request for data is a SQL query issued against a database, the requested data is a query result and the attributes indicate for each column of the plurality of columns whether the column is included in one of a WHERE clause, an ORDER BY clause and a GROUP BY clause of the SQL query.

15. The method of claim 1, further comprising:
determining historical information parameters for the requested data; and
wherein the re-ordering is performed on the basis of the determined historical information parameters.

16. The method of claim 15, wherein the historical information parameters describe for each column of N columns of the plurality of columns, where N is an integer, at least one of:
(i) a previous user interaction with the column;
(ii) a previous user selection of the column; and
(iii) a previous request for the column in similar requests for data.

17. The method of claim 15, wherein the historical information parameters describe for each row of M rows of the plurality of rows, where M is an integer, at least one of:
(i) a previous user interaction with the row;
(ii) a previous user selection of the row; and
(iii) a previous request for the row in similar requests for data.

18. The method of claim 1, further comprising:
determining properties of the requested data; and
wherein the re-ordering is performed on the basis of the determined properties.

19. The method of claim 18, wherein the determined properties include properties related to N columns of the plurality of columns, where N is an integer.

20. The method of claim 18, wherein the determined properties describe for each of the N columns at least one:
(i) the contained values;
(ii) a similarity between contained values;
(iii) a total number of contained values;
(iv) a range of contained values; and
(v) a size of the column.

21. A computer readable medium containing a program which, when executed, performs a process of managing display of requested data on a display device, the process comprising:
in response to a request for data, receiving the requested data in a tabular form having a plurality of columns and rows ordered according to an initial order, wherein the request for data is a query issued against a database and the requested data is a query result;
determining, from the data source, metadata describing an organizational structure of the requested data, wherein the determined metadata includes metadata related to N columns of the plurality of columns, where N is an integer, and describes for each of the N columns at least one of:
(i) an index over the column;
(ii) a previously created temporary index over the column;
(iii) a referential constraint over the column;
(iv) a check constraint over the column;
(v) a key associated with the column;
(vi) a trigger associated with the column;

(vii) a point of time associated with creation of the column; and (viii) a character code set used in the column;

re-ordering at least one of the columns and rows, wherein the re-ordering is done on the basis of rules configured to intelligently arrange presentation of the requested data to a user, and is performed on the basis of the determined metadata, and;

outputting the re-ordered requested data for display on the display device.

22. The computer readable medium of claim 21, wherein the process further comprises:

determining at least one of a weighting for each column and a weighting for each row of the plurality of columns and rows; and wherein the re-ordering is performed on the basis of the determined weightings.

23. The computer readable medium of claim 22, wherein the determined weightings are based on at least one of: (i) metadata describing an organizational structure of the requested data in the data source, (ii) statistical analysis information associated with the requested data in the data source, (iii) attributes of the request for data, (iv) historical information concerning the requested data, and (v) properties of the requested data.

24. The computer readable medium of claim 21, wherein the process further comprises:

determining data abnormalities in the requested data.

25. The computer readable medium of claim 21, wherein the requested data is received from a server-side data source and the re-ordering is done by a client-side application.

26. The computer readable medium of claim 21, wherein the re-ordering is done for emphasizing critical data.

27. The computer readable medium of claim 21, wherein the determined metadata describes whether one or more of the plurality of columns and rows is hidden in the data source.

28. The computer readable medium of claim 21, wherein the determined metadata describes whether one or more of the plurality of columns and rows has been sorted in the data source.

29. The computer readable medium of claim 21, wherein the process further comprises:

performing statistical analysis for the requested data to generate statistical information; and wherein the re-ordering is performed on the basis of the determined statistical information.

30. The computer readable medium of claim 29, wherein the determined statistical information describes for each column of N columns of the plurality of columns, where N is an integer:

(i) a frequency of display;
(ii) a frequency of selection;
(iii) a frequency of update;
(iv) a total number of contained values; and
(v) a number of unique contained values.

31. The computer readable medium of claim 29, wherein the determined statistical information describes for each row of M rows of the plurality of rows, where M is an integer:

(i) a frequency of display;
(ii) a frequency of selection;
(iii) a frequency of update;
(iv) a total number of contained values; and
(v) a number of unique contained values.

32. The computer readable medium of claim 29, wherein the determined statistical information describes physical locations in the data source.

33. The computer readable medium of claim 21, wherein the process further comprises:

determining attributes of the request for data; and wherein the re-ordering is performed on the basis of the determined attributes.

34. The computer readable medium of claim 33, wherein the request for data is a SQL query issued against a database, the requested data is a query result and the attributes indicate for each column of the plurality of columns whether the column is included in one of a WHERE clause, an ORDER BY clause and a GROUP BY clause of the SQL query.

35. The computer readable medium of claim 21, wherein the process further comprises:

determining historical information parameters for the requested data; and wherein the re-ordering is performed on the basis of the determined historical information parameters.

36. The computer readable medium of claim 35, wherein the historical information parameters describe for each column of N columns of the plurality of columns, where N is an integer, at least one of:

(i) a previous user interaction with the column;
(ii) a previous user selection of the column; and
(iii) a previous request for the column in similar requests for data.

37. The computer readable medium of claim 35, wherein the historical information parameters describe for each row of M rows of the plurality of rows, where M is an integer, at least one of:

(i) a previous user interaction with the row;
(ii) a previous user selection of the row; and
(iii) a previous request for the row in similar requests for data.

38. The computer readable medium of claim 21, wherein the process further comprises:

determining properties of the requested data; and wherein the re-ordering is performed on the basis of the determined properties.

39. The computer readable medium of claim 38, wherein the determined properties include properties related to N columns of the plurality of columns, where N is an integer.

40. The computer readable medium of claim 39, wherein the determined properties describe for each of the N columns at least one:

(i) the contained values;
(ii) a similarity between contained values;
(iii) a total number of contained values;
(iv) a range of contained values; and
(v) a size of the column.

41. A data processing system comprising:

a data source;

a display device; and a re-ordering application program residing in memory for managing display of requested data on the display device, the re-ordering application program being configured for:

in response to a request for data, receiving the requested data in a tabular form having a plurality of columns and rows ordered according to an initial order, wherein the request for data is a query issued against a database and the requested data is a query result;

determining, from the data source, metadata describing an organizational structure of the requested data, wherein the determined metadata includes metadata related to N columns of the plurality of columns, where N is an integer, and describes for each of the N columns at least one of:

(i) an index over the column;
(ii) a previously created temporary index over the column;
(iii) a referential constraint over the column;
(iv) a check constraint over the column;
(v) a key associated with the column;
(vi) a tripper associated with the column;
(vii) a point of time associated with creation of the column; and
(viii) a character code set used in the column
re-ordering at least one of the columns and rows, wherein the re-ordering is done on the basis of rules configured to intelligently arrange presentation of the requested data to a user, and is performed on the basis of the determined metadata, and;
outputting the re-ordered requested data for display on the display device.

42. The data processing system of claim 41, further comprising:
a requesting application program residing in memory for issuing the request for data.

* * * * *